(12) United States Patent
Huang et al.

(10) Patent No.: US 9,261,584 B2
(45) Date of Patent: Feb. 16, 2016

(54) POWER DIVIDER AND RADIO-FREQUENCY TRANSCEIVER SYSTEM

(71) Applicant: Wistron NeWeb Corporation, Hsinchu (TW)

(72) Inventors: Guo-Shu Huang, Hsinchu (TW); I-Shan Chen, Hsinchu (TW); Cheng-Hsiung Hsu, Hsinchu (TW); Hsin-Lung Hsiao, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 552 days.

(21) Appl. No.: 13/866,013

(22) Filed: Apr. 18, 2013

(65) Prior Publication Data

US 2014/0203960 A1    Jul. 24, 2014

(30) Foreign Application Priority Data

Jan. 23, 2013 (TW) .............................. 102102470 A

(51) Int. Cl.
  H01P 5/12    (2006.01)
  G01S 7/03    (2006.01)
  H01Q 1/32    (2006.01)
  H01Q 1/52    (2006.01)
  H01Q 21/00   (2006.01)

(52) U.S. Cl.
  CPC . *G01S 7/034* (2013.01); *H01P 5/12* (2013.01); *H01Q 1/3233* (2013.01); *H01Q 1/521* (2013.01); *H01Q 21/0006* (2013.01)

(58) Field of Classification Search
  CPC ...... H01P 5/12; H01Q 1/521; H01Q 21/0006; G01S 7/034

USPC .......................................... 333/120, 125–128
  See application file for complete search history.

(56) References Cited

U.S. PATENT DOCUMENTS

| | | | |
|---|---|---|---|
| 4,180,817 A | 12/1979 | Sanford | |
| 4,875,024 A * | 10/1989 | Roberts | ..................... H01P 5/16 333/127 |
| 6,121,930 A | 9/2000 | Grangeat | |

OTHER PUBLICATIONS

Kin-Lu Wong, "Compact and Broadband Microstrip antennas", 2002 by John Wiley & Sons, Inc., New York, cover page and p. 92-111, 261-267.
You-Chien Chen and Powen Hsu, "CPW-fed folded slot dipole antenna for mobile handset applications", 2011 IEEE International Symposium on Antennas and Propagation, p. 1932-1935, Jul. 3-8, 2011.

* cited by examiner

*Primary Examiner* — Robert Pascal
*Assistant Examiner* — Kimberly Glenn
(74) *Attorney, Agent, or Firm* — Winston Hsu; Scott Margo

(57) ABSTRACT

A radio-frequency transceiver system comprises a radio-frequency processing unit, a transmitting microwave network and a receiving microwave network, wherein the transmitting microwave network comprises a transmitting power divider for distributing main power of transmitting signals to two central sub-array antennas of four sub-array antennas, and the receiving microwave network comprises a receiving power divider for providing power mainly from a first input terminal and a second input terminal for a receiving route, and providing power mainly from the second input terminal and a third input terminal for another receiving route.

20 Claims, 7 Drawing Sheets

US 9,261,584 B2

POWER DIVIDER AND RADIO-FREQUENCY TRANSCEIVER SYSTEM

BACKGROUND OF THE INVENTION

1. Field of the Invention

The present invention relates to a power divider and a radio-frequency transceiver system, and more particularly, to a power divider and a radio-frequency transceiver system capable of effectively enhancing an array antenna gain, reducing an array antenna area, optimizing an antenna radiation pattern, reducing a reflection loss, and enhancing a side lobe suppression capability.

2. Description of the Prior Art

An array antenna is an antenna system consisting of a plurality of identical antennas arranged according to a certain rule, and is widely used in a radar system. The commonly-seen array antenna system is implemented by a manufacturing process of a printed circuit board, and antennas and a power divider are disposed in different layers of a substrate. In order to connect signals between different layers, a via hole is taken as a bridge. However, since transmission of the signals between the different layers only relies on the via hole, when a position of the via hole is changed due to a process variation or a process inaccuracy, frequency shift occurs and an overall system performance is reduced. Moreover, since an operating frequency of the radar system is mostly utilized in a microwave frequency band, as the operating frequency is getting higher, a distance passed through the via hole may be longer. When the distance is close to a quarter wavelength of the signals, an impedance matching issue would become more serious. As a result, the corresponding design becomes more complex and the antenna gain is reduced, leading to a shorter detecting distance and a narrower scanning angle.

Therefore, how to avoid the frequency shift and the degradation of antenna performance of the array antenna due to the process inaccuracy of wiring between different layers has become an industry target. Moreover, to further enhance the antenna gain, so as to enhance the detecting distance or reduce a required area, is also the industry target.

SUMMARY OF THE INVENTION

It is therefore an objective of the present invention to provide a power divider and a radio-frequency transceiver system.

The present invention discloses a power divider, for transmitting a signal of an input terminal to a first output terminal, a second output terminal, a third output terminal, and a fourth output terminal. The power divider comprises a first connecting wire, comprising a first terminal and a second terminal; a second connecting wire, comprising a first terminal and a second terminal; a first ring-shaped transmission unit, comprising a first ground element and a first ring-shaped conductive circle surrounding the first ground element, wherein a first terminal of the first ring-shaped conductive circle is electrically connected to the input terminal, a second terminal of the first ring-shaped conductive circle is electrically connected to the first terminal of the first connecting wire, and a third terminal of the first ring-shaped conductive circle is electrically connected to the first terminal of the second connecting wire, wherein a width of the first ring-shaped conductive circle is substantially equal to a first value; a second ring-shaped transmission unit, comprising a second ground element and a second ring-shaped conductive circle surrounding the second ground element, wherein a first terminal of the second ring-shaped conductive circle is electrically connected to the second terminal of the first connecting wire, a second terminal of the second ring-shaped conductive circle is electrically connected to the first output terminal, and a third terminal of the second ring-shaped conductive circle is electrically connected to the second output terminal, wherein the second ring-shaped conductive circle comprises a plurality of segments each with a length substantially equal to a quarter wavelength of the signal, and the plurality of segments are substantially divided into a plurality of groups according to widths of the segments; and a third ring-shaped transmission unit, comprising a third ground element and a third ring-shaped conductive circle surrounding the third ground element, wherein a first terminal of the third ring-shaped conductive circle is electrically connected to the second terminal of the second connecting wire, a second terminal of the third ring-shaped conductive circle is electrically connected to the fourth output terminal, and a third terminal of the second ring-shaped conductive circle is electrically connected to the third output terminal, wherein the third ring-shaped conductive circle comprises a plurality of segments each with a length substantially equal to a quarter wavelength of the signal, and the plurality of segments are substantially divided into a plurality of groups according to widths of the segments.

The present invention further discloses a power divider, for transmitting signals of a first input terminal, a second input terminal, and a third input terminal to a first output terminal and a second output terminal. The power divider comprises a first connecting wire, comprising a first terminal and a second terminal; a second connecting wire, comprising a first terminal and a second terminal; a first ring-shaped transmission unit, comprising a first ground element and a first ring-shaped conductive circle surrounding the first ground element, wherein a first terminal of the first ring-shaped conductive circle is electrically connected to the second input terminal, a second terminal of the first ring-shaped conductive circle is electrically connected to the first terminal of the first connecting wire, and a third terminal of the first ring-shaped conductive circle is electrically connected to the first terminal of the second connecting wire, wherein a width of the first ring-shaped conductive circle is substantially equal to a first value; a second ring-shaped transmission unit, comprising a second ground element and a second ring-shaped conductive circle surrounding the second ground element, wherein a first terminal of the second ring-shaped conductive circle is electrically connected to the first output terminal, a second terminal of the second ring-shaped conductive circle is electrically connected to the first input terminal, and a third terminal of the second ring-shaped conductive circle is electrically connected to the second terminal of the first connecting wire, wherein a width of the second ring-shaped conductive circle from the first terminal to the second terminal is substantially equal to a second value, and a width of the second ring-shaped conductive circle from the first terminal to the third terminal is substantially equal to a third value; and a third ring-shaped transmission unit, comprising a third ground element and a third ring-shaped conductive circle surrounding the third ground element, wherein a first terminal of the third ring-shaped conductive circle is electrically connected to the second output terminal, a second terminal of the third ring-shaped conductive circle is electrically connected to the third input terminal, and a third terminal of the second ring-shaped conductive circle is electrically connected to the second terminal of the second connecting wire, wherein a width of the third ring-shaped conductive circle from the first terminal to the second terminal is substantially equal to a fourth value, and a width of the third ring-shaped conductive circle from the first terminal to the third terminal is substantially equal to a fifth value; wherein the second value is not equal to the third value, and the fourth value is not equal to the fifth value.

The present invention further discloses a radio-frequency transceiver system comprising a transmitting power divider, for transmitting a signal of an input terminal to a first output terminal, a second output terminal, a third output terminal, and a fourth output terminal, the transmitting power divider comprising a first connecting wire, comprising a first terminal and a second terminal; a second connecting wire, comprising a first terminal and a second terminal; a first ring-shaped transmission unit, comprising a first ground element and a first ring-shaped conductive circle surrounding the first ground element, wherein a first terminal of the first ring-shaped conductive circle is electrically connected to the input terminal, a second terminal of the first ring-shaped conductive circle is electrically connected to the first terminal of the first connecting wire, and a third terminal of the first ring-shaped conductive circle is electrically connected to the first terminal of the second connecting wire, wherein a width of the first ring-shaped conductive circle is substantially equal to a first value; a second ring-shaped transmission unit, comprising a second ground element and a second ring-shaped conductive circle surrounding the second ground element, wherein a first terminal of the second ring-shaped conductive circle is electrically connected to the second terminal of the first connecting wire, a second terminal of the second ring-shaped conductive circle is electrically connected to the first output terminal, and a third terminal of the second ring-shaped conductive circle is electrically connected to the second output terminal, wherein the second ring-shaped conductive circle comprises a plurality of segments each with a length substantially equal to a quarter wavelength of the signal, and the plurality of segments are substantially divided into a plurality of groups according to widths of the segments; and a third ring-shaped transmission unit, comprising a third ground element and a third ring-shaped conductive circle surrounding the third ground element, wherein a first terminal of the third ring-shaped conductive circle is electrically connected to the second terminal of the second connecting wire, a second terminal of the third ring-shaped conductive circle is electrically connected to the fourth output terminal, and a third terminal of the second ring-shaped conductive circle is electrically connected to the third output terminal, wherein the third ring-shaped conductive circle comprises a plurality of segments each with a length substantially equal to a quarter wavelength of the signal, and the plurality of segments are substantially divided into a plurality of groups according to widths of the segments; a receiving power divider, for transmitting signals of a first input terminal, a second input terminal, and a third input terminal to a fifth output terminal and a sixth output terminal, the receiving power divider comprising a third connecting wire, comprising a first terminal and a second terminal; a fourth connecting wire, comprising a first terminal and a second terminal; a fourth ring-shaped transmission unit, comprising a fourth ground element and a fourth ring-shaped conductive circle surrounding the fourth ground element, wherein a first terminal of the fourth ring-shaped conductive circle is electrically connected to the second input terminal, a second terminal of the fourth ring-shaped conductive circle is electrically connected to the first terminal of the third connecting wire, and a third terminal of the fourth ring-shaped conductive circle is electrically connected to the first terminal of the fourth connecting wire, wherein a width of the fourth ring-shaped conductive circle is substantially equal to a first value; a fifth ring-shaped transmission unit, comprising a fifth ground element and a fifth ring-shaped conductive circle surrounding the fifth ground element, wherein a first terminal of the fifth ring-shaped conductive circle is electrically connected to the first output terminal, a second terminal of the fifth ring-shaped conductive circle is electrically connected to the first input terminal, and a third terminal of the fifth ring-shaped conductive circle is electrically connected to the second terminal of the third connecting wire, wherein a width of the fifth ring-shaped conductive circle from the first terminal to the second terminal is substantially equal to a second value, and a width of the fifth ring-shaped conductive circle from the first terminal to the third terminal is substantially equal to a third value; and a sixth ring-shaped transmission unit, comprising a sixth ground element and a sixth ring-shaped conductive circle surrounding the sixth ground element, wherein a first terminal of the sixth ring-shaped conductive circle is electrically connected to the second output terminal, a second terminal of the sixth ring-shaped conductive circle is electrically connected to the third input terminal, and a third terminal of the sixth ring-shaped conductive circle is electrically connected to the second terminal of the fourth connecting wire, wherein a width of the sixth ring-shaped conductive circle from the first terminal to the second terminal is substantially equal to a fourth value, and a width of the sixth ring-shaped conductive circle from the first terminal to the third terminal is substantially equal to a fifth value; wherein the second value is not equal to the third value, and the fourth value is not equal to the fifth value; a radio-frequency processing unit, for generating a differential transmitting signal, and processing a first differential receiving signal and a second differential receiving signal; a transmitting array antenna, comprising a first sub-array antennas, a second sub-array antennas, a third sub-array antennas, and a fourth sub-array antennas, respectively coupled to the first output terminal, the second output terminal, the third output terminal, and the fourth output terminal of the transmitting power divider; a receiving array antenna, comprising a fifth sub-array antennas, a sixth sub-array antennas, and a seventh sub-array antennas, respectively coupled to the first input terminal, the second input terminal, and the third input terminal of the receiving power divider; a first ring-shaped coupler, coupled between the radio-frequency processing unit and the input terminal of the transmitting power divider, for converting the differential transmitting signal to output to the input terminal; a second ring-shaped coupler, coupled between the radio-frequency processing unit and the fifth output terminal of the receiving power divider, for converting a signal of the fifth output terminal to the first differential receiving signal; and a third ring-shaped coupler, coupled between the radio-frequency processing unit and the sixth output terminal of the receiving power divider, for converting a signal of the sixth output terminal to the second differential receiving signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
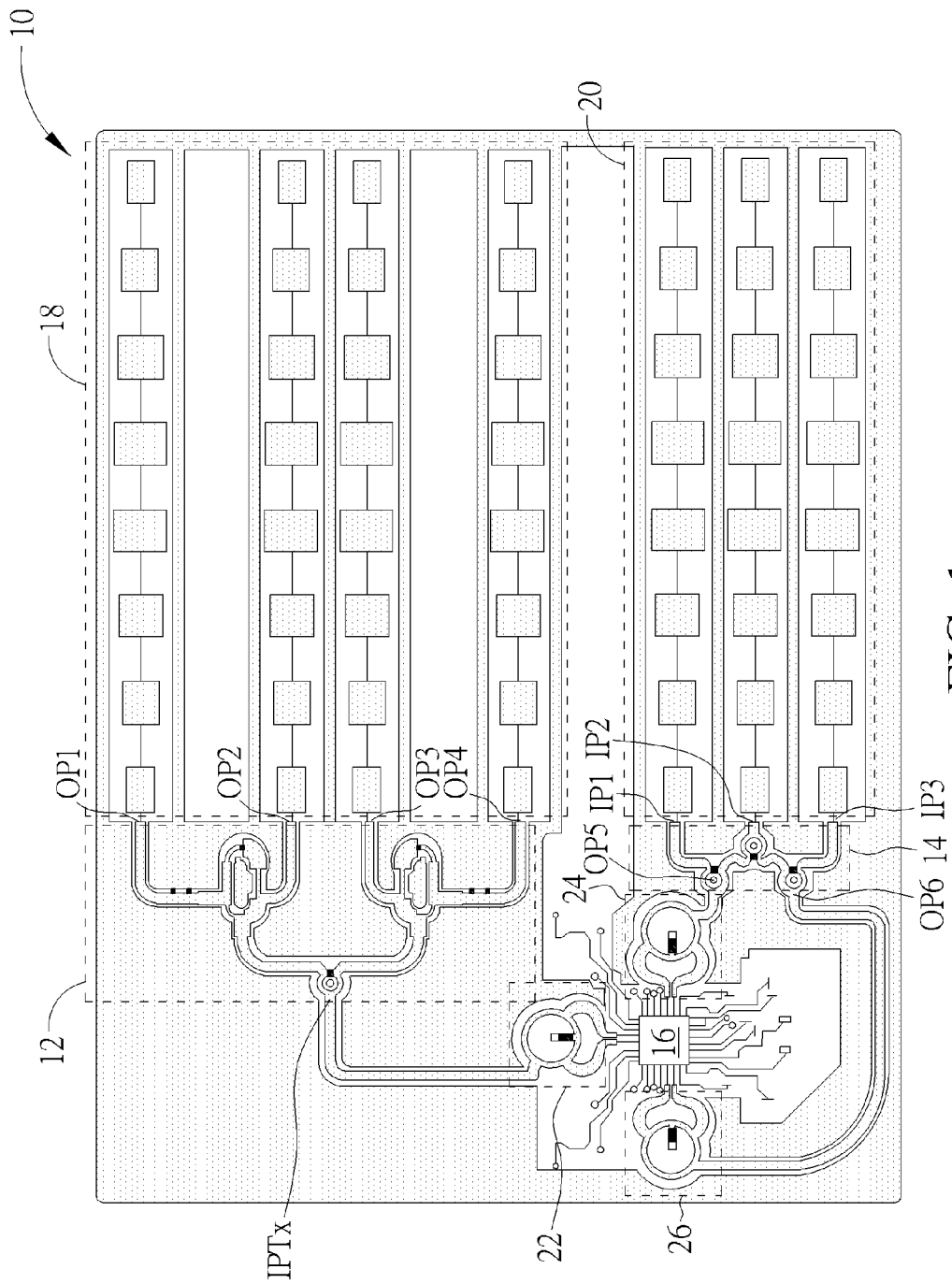
FIG. 1 illustrates a schematic diagram of a radio-frequency transceiver system according to an embodiment of the present invention.

Please refer to FIG. 1, which illustrates a schematic diagram of a radio-frequency transceiver system 10 according to an embodiment of the present invention. The radio-frequency transceiver system 10 may be a microwave transceiver network of a radar system, such as an array antenna for car uses, etc., and is not limited herein. The radio-frequency transceiver system 10 is substantially disposed on the same plane, such as a bottom layer or an upper layer of a circuit board, and includes a transmitting power divider 12, a receiving power divider 14, a radio-frequency processing unit 16, a transmitting array antenna 18, a receiving array antenna 20, and ring-shaped couplers 22, 24, 26.

For a transmitting operation, differential signals to be transmitted are converted to single-ended signals by the ring-shaped coupler 22, and are transmitted to an input terminal IPTx of the transmitting power divider 12 by the radio-frequency processing unit 16. The transmitting power divider 12 may distribute the received signals to output terminals OP1, OP2, OP3, OP4 with a relationship of a first power ratio, simultaneously performs a phase adjustment, and finally transmits the received signals to air via the transmitting array antenna 18. In other words, the ring-shaped coupler 22, the transmitting power divider 12, and the transmitting array antenna 18 may be regarded as a transmitting microwave network in a microwave transceiver network.

Relatively for a receiving operation, the receiving power divider 14 receives radio-frequency signals sensed by the receiving array antenna 20 through input terminals IP1, IP2, and IP3, and respectively distributes the radio-frequency signals to output terminals OP5, OP6 with a relationships of a second power ratio and a third power ratio. The ring-shaped couplers 24, 26 may convert signals of the output terminals OP5, OP6 to a first differential receiving signal and a second differential receiving signal and transmit the first and second differential receiving signals to the radio-frequency processing unit 16 for performing a signal processing of the radio-frequency signals by the radio-frequency processing unit 16. In other words, the ring-shaped couplers 24, 26, the receiving power divider 14, and the receiving array antenna 20 may be regarded as a receiving microwave network in the microwave transceiver network.

Moreover, the first power ratio (i.e. the power ratio from the input terminal IPTx to the output terminals OP1-OP4) complies with a relationship of (0.001~0.1):1:1:(0.001~0.1). In other words, power of the transmitting signals is mostly distributed to the output terminals OP2, OP3, and meanwhile, a phase of the signals of the output terminals OP1, OP2 and a phase of the signals of the output terminals OP3, OP4 are inverse. In addition, the second power ratio (i.e. the power ratio of the input terminals IP1-IP3 relative to the output terminal OP5) complies with a relationship of (1~10):1:(0.001~0.1), and the third power ratio (i.e. the power ratio of the input terminals IP1-IP3 relative to the output terminal OP6) complies with a relationship of (0.001~0.1):1:(1~10). In other words, for the output terminal OP5, the radio-frequency signals are mainly transmitted from the input terminals IP1, IP2, and for the output terminal OP6, the radio-frequency signals are mainly transmitted from the input terminals IP2, IP3. Therefore, the input terminal IP2 may be regarded as a common signal source for the output terminals OP5 and OP6. In short, the radio-frequency transceiver system 10 of the present invention mostly distributes power of the transmitting signals to the output terminals OP2, OP3 by the transmitting power divider 12, makes the phase of the signals of the output terminals OP1, OP2 to be inverse to the phase of the signals of the output terminals OP3, OP4, and uses the receiving power divider 14 to let the output terminals OP5 and OP6 share the input terminal IP2.

Figure 2A:
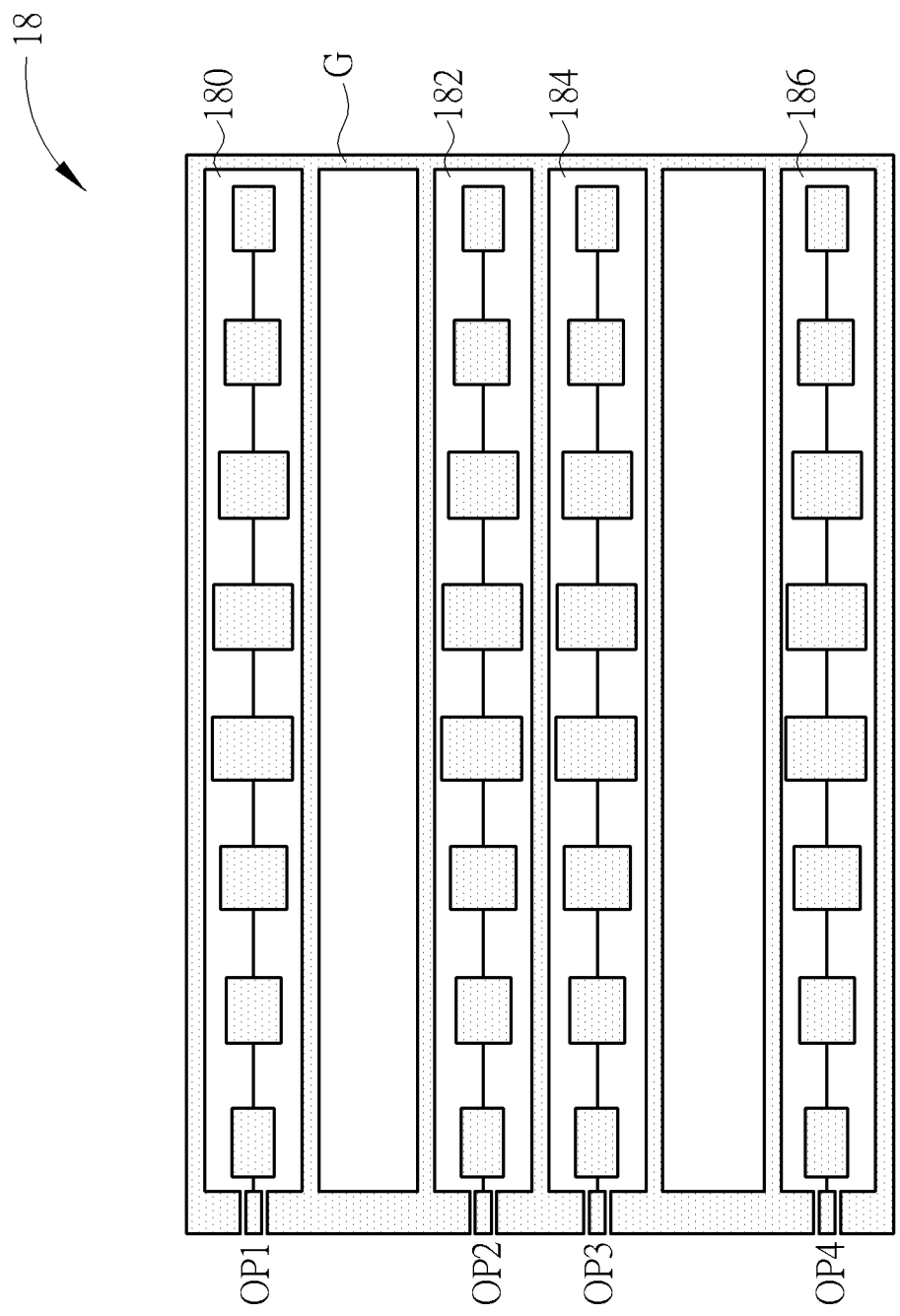
FIG. 2A illustrates a schematic diagram of a transmitting array antenna in FIG. 1.
Figure 2B:
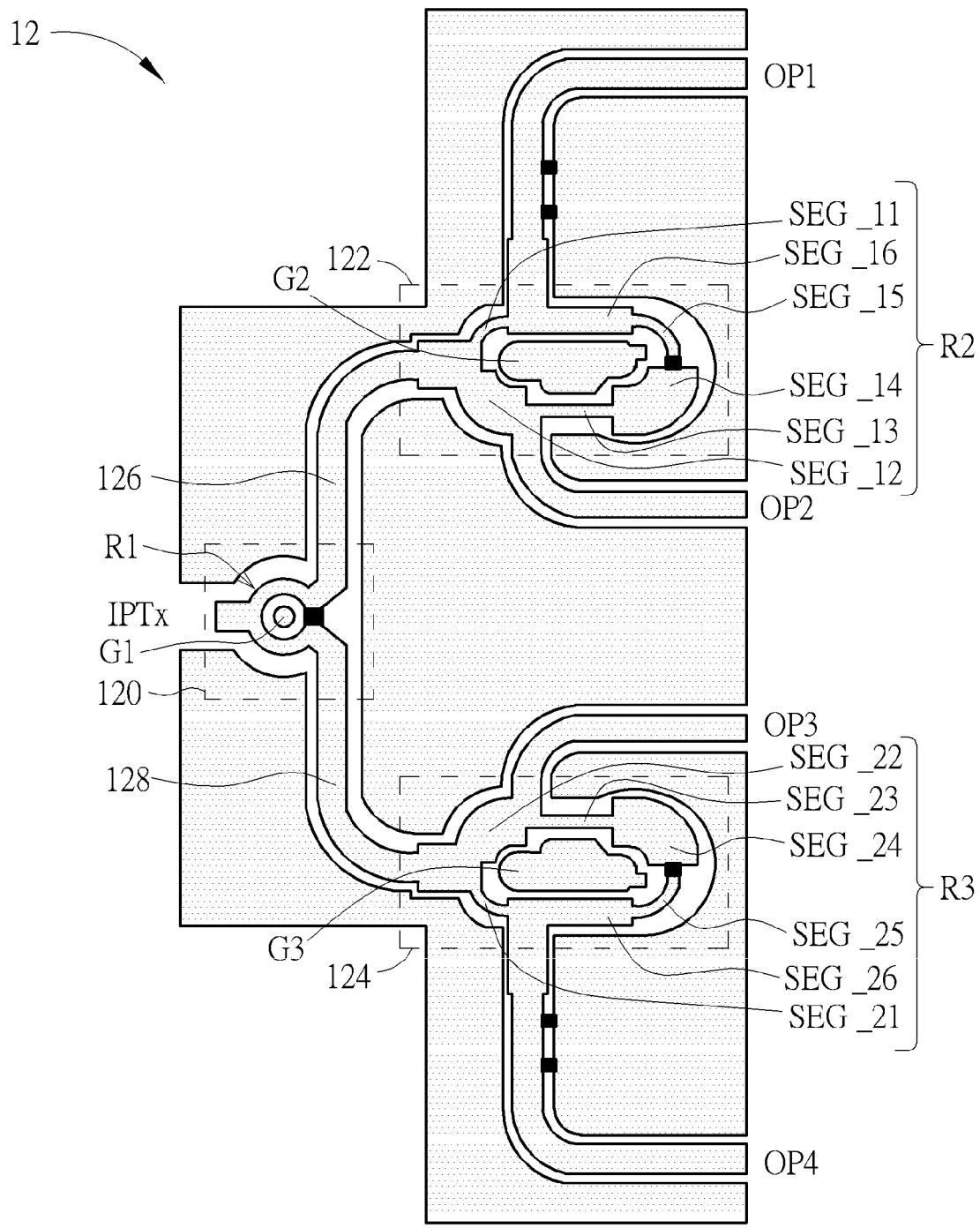
FIG. 2B illustrates a schematic diagram of a transmitting power divider in FIG. 1.

For clear illustration, please refer to FIGS. 2A and 2B. FIGS. 2A and 2B respectively illustrate schematic diagrams of the transmitting array antenna 18 and the transmitting power divider 12 in FIG. 1. As shown in FIG. 2A, the transmitting array antenna 18 includes four sub-arrays antennas 180, 182, 184, 186, which are respectively coupled to the output terminals OP1, OP2, OP3, OP4. In other words, an exciter or feed-in position of the transmitting array antenna 18 is at a side thereof, and a ground element G is disposed between the adjacent sub-array antennas to enhance isolation. In addition, each of the sub-array antennas 180-186 consists of eight radiating elements and connecting wires for connecting the eight radiating elements. A length of each radiating element and each connecting wire is substantially equal to a half wavelength of the transmitting signal, and widths of the radiating elements are monotonically decreased from a center to both sides of the sub-array antenna. Thus, an intensity distribution may be a same relationship (the strongest in the center and being monotonically decreased to the both sides), such that the power is gathered on an elevation plane to enhance an antenna gain and a side lobe suppression capability. Besides, the transmitting array antenna 18 totally utilizes the four sub-array antennas 180-186 and a wider beam may be achieved on an azimuth plane.

Furthermore, as shown in FIG. 2B, the transmitting power divider 12 mainly consists of ring-shaped transmission units 120, 122, 124 and connecting wires 126 and 128. The ring-shaped transmission units 120, 122, 124 are three-terminal elements, which respectively consist of ground elements G1, G2, G3 and ring-shaped conductive circles R1, R2, R3 surrounding the ground elements G1, G2, G3. In detail, in the ring-shaped transmission unit 120, the ring-shaped conductive circle R1 is electrically connected to the input terminal IPTx and the connecting wires 126 and 128, and a distance from the input terminal IPTx to the connecting wire 126 is substantially equal to a distance from the input terminal IPTx to the connecting wire 128. A width of the ring-shaped conductive circle R1 is substantially fixed to or close to a certain value. In such a condition, the ring-shaped transmission unit 120 is an equal power divider. In the ring-shaped transmission unit 122, the ring-shaped conductive circle R2 is electrically connected to the output terminals OP1, OP2 and the connecting wire 126. The ring-shaped conductive circle R2 consists of six segments SEG_11-SEG_16 and a length of each segment SEG_11-SEG_16 is substantially equal to a quarter wavelength of the transmitted signal. Beside, in the ring-shaped transmission unit 124, the ring-shaped conductive circle R3 is electrically connected to the output terminals OP3 and OP4 and the connecting wire 128. The ring-shaped conductive circle R3 consists of six segments SEG_21-SEG_26 and a length of each segment SEG_21-SEG_26 is substantially equal to a quarter wavelength of the transmitted signal. Additionally, in the transmitting power divider 12, the black blocks are represented as resistors for adjusting impedances.

Comparing the ring-shaped transmission unit 122 and the ring-shaped transmission unit 124 may show that the ring-shaped transmission unit 124 and the ring-shaped transmission unit 122 are symmetrical in accordance with a division between the output terminal OP2 and the output terminal OP3, so as to generate inverse signal phases at the output terminals OP3, OP4 and at the output terminals OP1, OP2. Thus, a null may be generated near the zero degree. In addition, the segments SEG_11-SEG_16 and the segments SEG_21-SEG_26 are wide and narrow alternately. In other words, based upon the widths of the segments, the segments SEG_11-SEG_16 and the segments SEG_21-SEG_26 may be divided into multiple groups. The transmitting power divider 12 may achieve a weighting distribution by arranging the segments of the different widths. For example, since the widths of the segments SEG_11, SEG_21 are significantly smaller than the widths of the segments SEG_12, SEG_22, power may be mostly distributed to the output terminals OP2 and OP3 of the inner side (i.e. the sub-array antennas 182 and 184). In other words, the transmitting power divider 12 is a two-stage five-port unequal power divider for gathering the main power for the output terminals OP2 and OP3 of the inner side and generating the inverse phases between the output terminals OP1, OP2 and the output terminals OP3, OP4, to induce the null near the zero degree, so as to achieve a wider scanning angle on the azimuth plane.

Figure 3A:
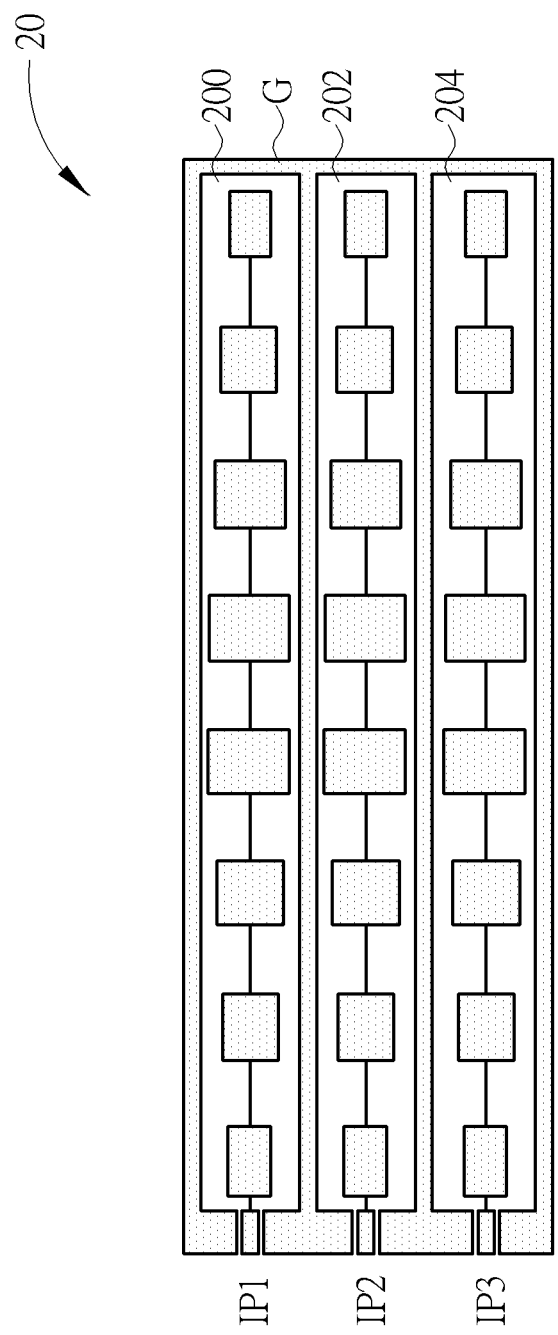
FIG. 3A illustrates a schematic diagram of a receiving array antenna in FIG. 1.
Figure 3B:
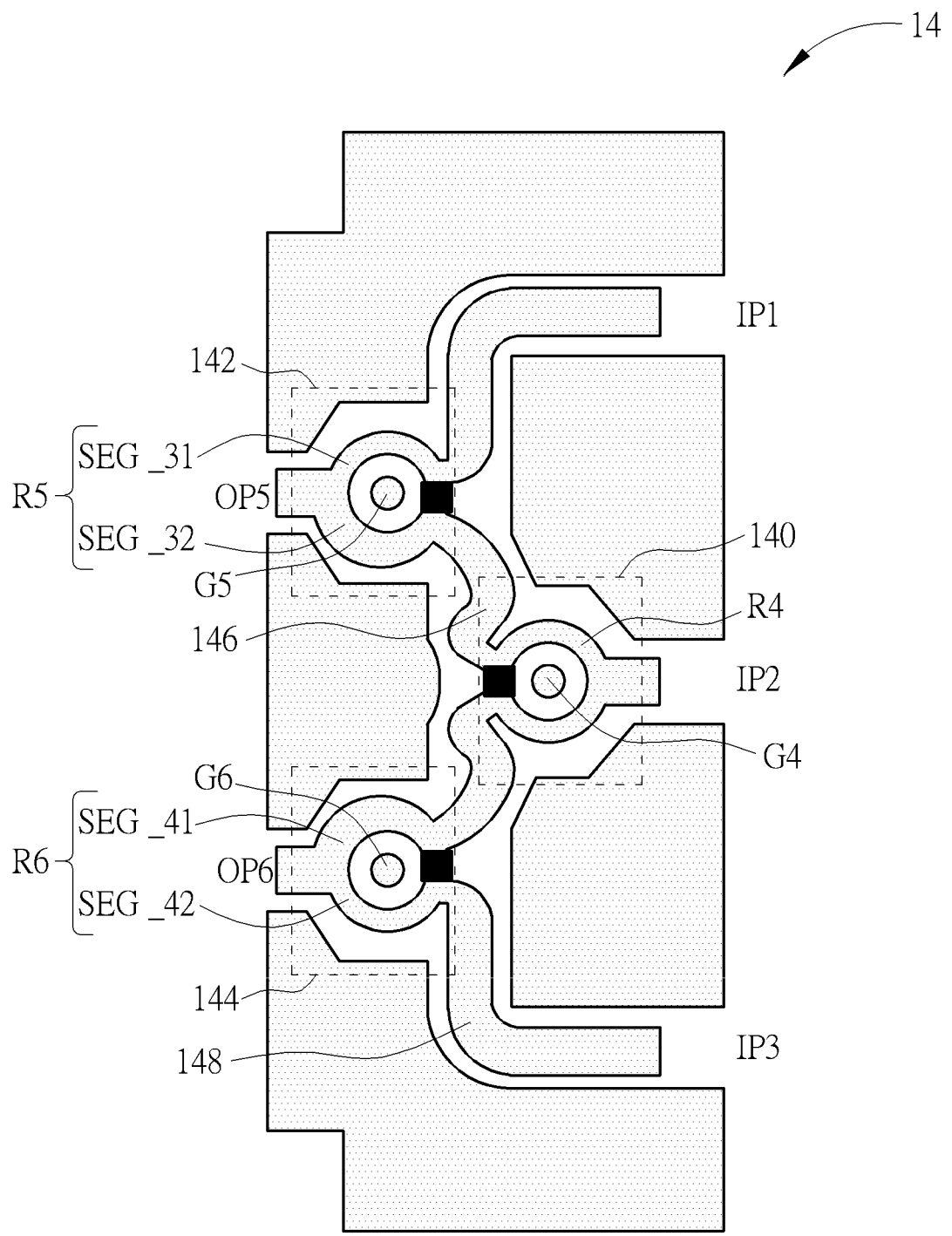
FIG. 3B illustrates a schematic diagram of a receiving power divider in FIG. 1.

Please refer to FIGS. 3A and 3B, which illustrate schematic diagrams of a receiving array antenna 20 and a receiving power divider 14 in FIG. 1. As shown in FIG. 3A, the receiving array antenna 20 includes three sub-arrays antennas 200, 202, 204, which are respectively coupled to the input terminals IP1, IP2, IP3. The configuring methods of radiating elements and connecting wires for connecting the radiating elements of the sub-array antennas 200, 202, 204 are similar to the sub-array antennas 180-186, and since widths of the radiating elements are similarly monotonically decreased from a center to both sides of the sub-array antenna, the working methods are also similar and will not be narrated hereinafter.

Furthermore, as shown in FIG. 3B, the receiving power divider 14 mainly consists of ring-shaped transmission units 140, 142, 144 and connecting wires 146, 148. The ring-shaped transmission units 140, 142, 144 are three-terminal elements, which respectively consist of ground elements G4, G5, G6 and ring-shaped conductive circles R4, R5, R6 surrounding the ground elements G4, G5, G6. In detail, in the ring-shaped transmission unit 140, the ring-shaped conductive circle R4 is electrically connected to the input terminal IP2 and the connecting wires 146, 148, and a distance from the input terminal IP2 to the connecting wire 146 is substantially equal to a distance from the input terminal IP2 to the connecting wire 148. A width of the ring-shaped conductive circle R4 is substantially fixed to or close to a certain value. In such a condition, the ring-shaped transmission unit 140 is an equal power divider. In the ring-shaped transmission unit 142, the ring-shaped conductive circle R5 is electrically connected to the output terminal OP5, the input terminal IP1, and the connecting wire 146, and the ring-shaped conductive circle R5 consists of two segments SEG_31, SEG_32. Besides, in the ring-shaped transmission unit 144, the ring-shaped conductive circle R6 is electrically connected to the output terminal OP6, the input terminal IP3, and the connecting wire 148, and the ring-shaped conductive circle R6 consists of two segments SEG_41, SEG_42. Additionally, in the transmitting power divider 14, the black blocks are represented as resistors for adjusting impedances.

Widths of the segments SEG_31, SEG_32, SEG_41, SEG_42 (or a width ratio of the segments SEG_31, SEG_32, and a width ratio of the segments SEG_41, SEG_42) are related to a power ratio of the input terminals IP1-IP3 relative to the output terminals OP5, OP6. More specifically, since the widths of the segments SEG_31, SEG_41 are smaller than the widths of the segments SEG_32, SEG_42, and the ring-shaped transmission unit 140 equally distributes signal power of the input terminal IP2 to the ring-shaped transmission units 142, 144, the power ratio of the input terminals IP1-IP3 relative to the output terminals OP5 may comply with a relationship of (1~10):1:(0.001~0.1), and the power ratio of the input terminals IP1-IP3 relative to the output terminals OP6 complies with a relationship of (0.001~0.1):1:(1~10). In other words, the main power of the output terminal OP5 is contributed from the input terminals IP1, IP2, and the main power of the output terminal OP6 is contributed from the input terminals IP2, IP3, wherein the input terminal IP2 (or the sub-array antenna 202) is shared, and the required areas of the sub-array antennas may be reduced. Therefore, for the receiving route from the output terminal OP5 through the ring-shaped coupler 24 to the radio-frequency processing unit 16, the main signal power is provided from the input terminals IP1, IP2 (i.e. the sub-array antenna 202, 202); for the receiving path from the output terminal OP6 through the ring-shaped coupler 26 to the radio-frequency processing unit 16, the main signal power is provided from the input terminals IP2, IP3 (i.e. the sub-array antenna 202, 204).

Figure 4:
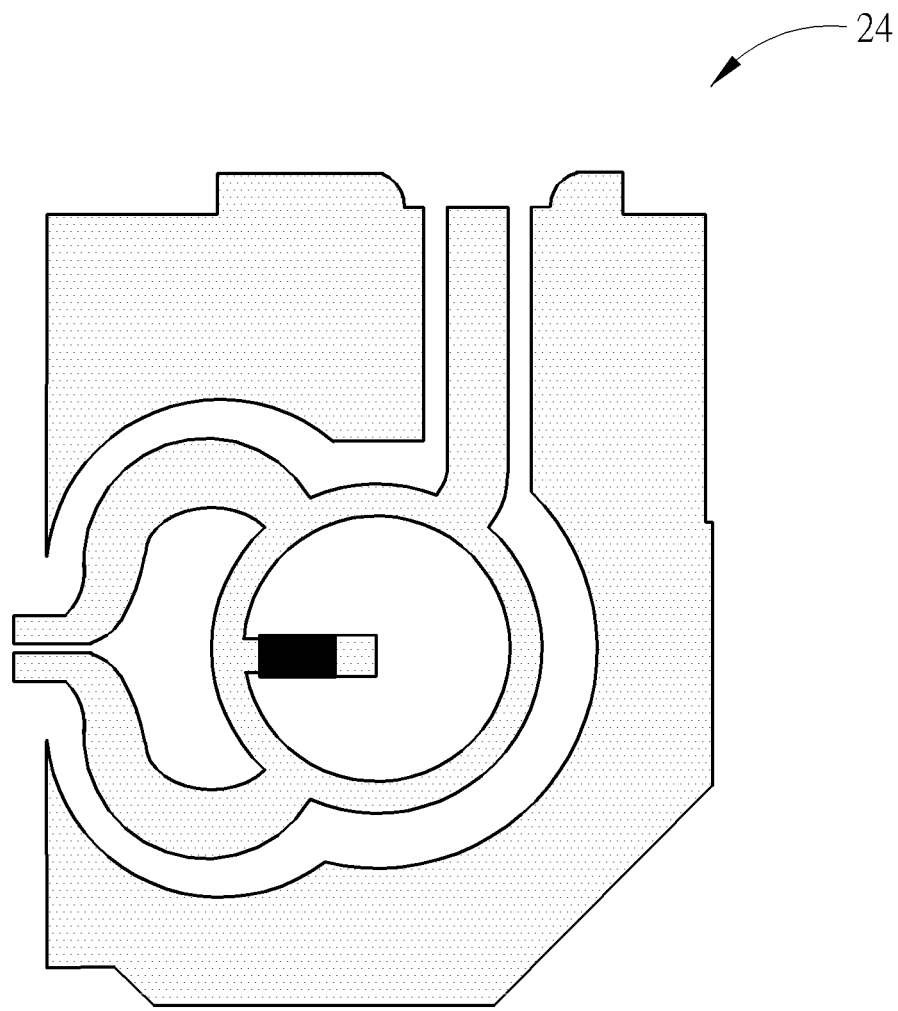
FIG. 4 illustrates a schematic diagram of a ring-shaped coupler in FIG. 1.

Besides, please refer to FIG. 4, which illustrates a schematic diagram of the ring-shaped coupler 24 in FIG. 1. Since the structures of the ring-shaped couplers 22, 24, 26 are the same, only the ring-shaped couple 24, as a representation, is shown. The ring-shaped couplers 22, 24, 26 may convert the differential signals to the single-ended signals to meet a processing requirement of the radio-frequency processing unit 16. In addition, in the ring-shaped coupler 24, the black block is represented as a resistor for adjusting impedance.

Figure 5:
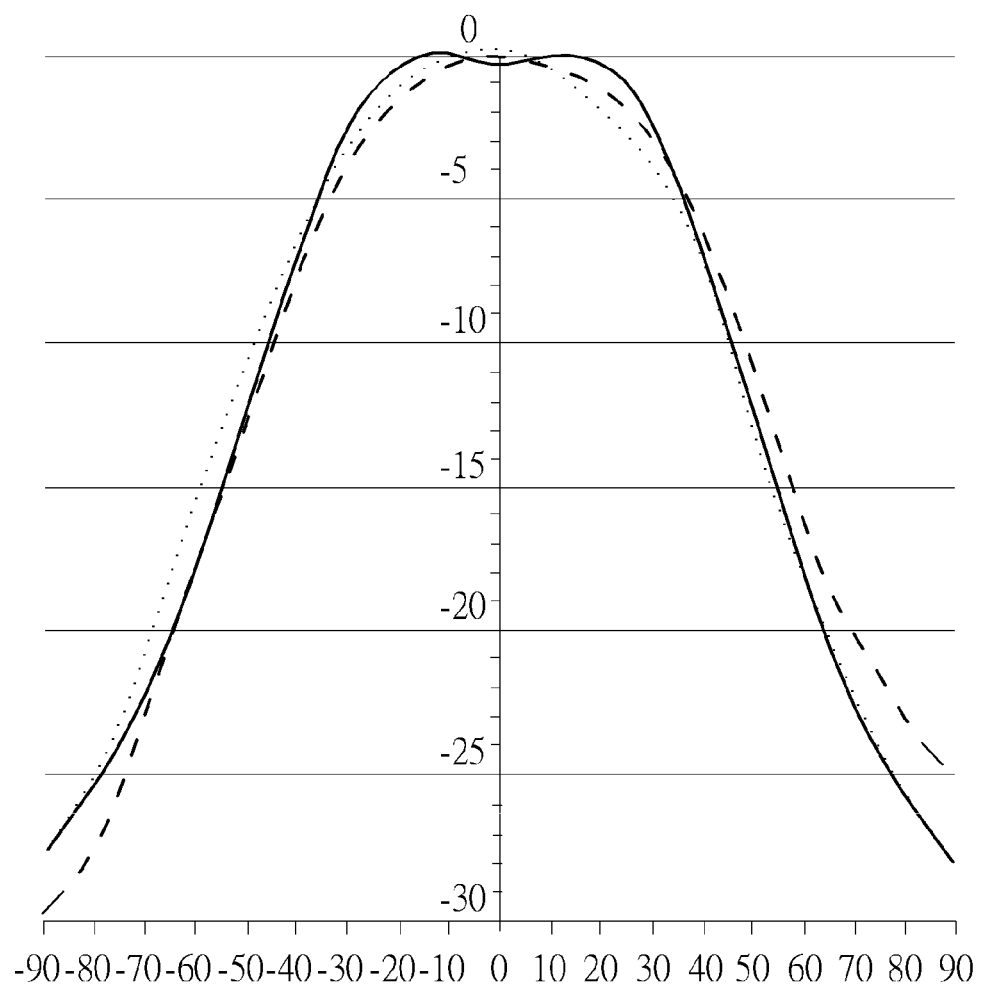
FIG. 5 illustrates a schematic diagram of a two-dimensional antenna radiation pattern of a radio-frequency transceiver system in FIG. 1.

As can be seen, the radio-frequency transceiver system 10 distributes most power of the transmitting signals to the inner sub-array antennas 182, 184, and generates the inverse phases between the sub-array antennas 180,182 and the sub-array antennas 184,186 to generate the null near the zero degree, so as to achieve the wider scanning angle on the azimuth plane. Besides, the radio-frequency transceiver system 10 uses the receiving power divider 14 to provide the main power of the output terminal OP5 from the input terminals IP1, IP2, and provide the main power of the output terminal OP6 from the input terminals IP2, IP3; that is, the sub-array antenna 202 is shared, and the required areas of the sub-array antennas may be reduced. Please refer to FIG. 5, which illustrates a schematic diagram of a two-dimensional antenna radiation pattern of the radio-frequency transceiver system 10. In FIG. 5, the solid curve is represented as an antenna radiation pattern under transmission, the dotted curve is represented as an antenna radiation pattern of the output terminal OP5, and the dashed curve is represented as an antenna radiation pattern of the output terminal OP6. As can be seen, when the transmitting signals are transmitted, since the transmitting power divider 12 may generate the signals with the inverse phases, the null is generated at the zero degree on the azimuth plane to obtain the wider detecting angle. The radiation pattern under receiving is symmetrical to the zero degree, and the signals from the left and right sides are respectively received to facilitate to increase the scanning angle.

In addition, each component of the radio-frequency transceiver system 10 is disposed on the same plane. In other words, a via hole is not required to serve as the transmission of the signals for a critical connection to avoid frequency shift and antenna performance degradation caused by a process inaccuracy of wiring between different layers. Thus, only a single-layer high frequency circuit board is required to achieve a high antenna gain and increase the detecting angle, and further reduce the manufacturing cost.

In summary, the radio-frequency transceiver system of the present invention may effectively enhance an array antenna gain, reduce an array antenna area, optimize an antenna radiation pattern, reduce a reflection loss, and enhance a side lobe suppression capability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power divider, for transmitting a signal of an input terminal to a first output terminal, a second output terminal, a third output terminal, and a fourth output terminal, the power divider comprising:
    a first connecting wire, comprising a first terminal and a second terminal;
    a second connecting wire, comprising a first terminal and a second terminal;
    a first ring-shaped transmission unit, comprising a first ground element and a first ring-shaped conductive circle surrounding the first ground element, wherein a first terminal of the first ring-shaped conductive circle is electrically connected to the input terminal, a second terminal of the first ring-shaped conductive circle is electrically connected to the first terminal of the first connecting wire, and a third terminal of the first ring-shaped conductive circle is electrically connected to the first terminal of the second connecting wire, wherein a width of the first ring-shaped conductive circle is substantially equal to a first value;
    a second ring-shaped transmission unit, comprising a second ground element and a second ring-shaped conductive circle surrounding the second ground element, wherein a first terminal of the second ring-shaped conductive circle is electrically connected to the second terminal of the first connecting wire, a second terminal of the second ring-shaped conductive circle is electrically connected to the first output terminal, and a third terminal of the second ring-shaped conductive circle is electrically connected to the second output terminal, wherein the second ring-shaped conductive circle comprises a plurality of segments each with a length substantially equal to a quarter wavelength of the signal, and the plurality of segments are substantially divided into a plurality of groups according to widths of the segments; and
    a third ring-shaped transmission unit, comprising a third ground element and a third ring-shaped conductive circle surrounding the third ground element, wherein a first terminal of the third ring-shaped conductive circle is electrically connected to the second terminal of the second connecting wire, a second terminal of the third ring-shaped conductive circle is electrically connected to the fourth output terminal, and a third terminal of the second ring-shaped conductive circle is electrically connected to the third output terminal, wherein the third ring-shaped conductive circle comprises a plurality of segments each with a length substantially equal to a quarter wavelength of the signal, and the plurality of segments are substantially divided into a plurality of groups according to widths of the segments.

2. The power divider of claim 1, wherein the first output terminal, the second output terminal, the third output terminal, and the fourth output terminal are substantially arranged in a sequence.

3. The power divider of claim 2, wherein the second ring-shaped conductive circle and the third ring-shaped conductive circle are symmetrical in accordance with a division between the second output terminal and the third output terminal, such that output signals of the first output terminal and the second output terminal have a first phase, output signals of the third output terminal and the fourth output terminal have a second phase, and the first phase and the second phase are substantially inverse.

4. The power divider of claim 3, wherein a width of a segment from the first terminal to the second terminal of the second ring-shaped conductive circle or the third ring-shaped conductive circle is smaller than a width of another segment from the first terminal to the third terminal of the second ring-shaped conductive circle or the third ring-shaped conductive circle, such that a power ratio from the input terminal to the first output terminal, the second output terminal, the third output terminal, and the fourth output terminal complies with a relationship of a:b:b:a.

5. The power divider of claim 4, wherein "a" is a value between 0.001 and 0.1, and "b" is a value equal to 1.

6. The power divider of claim 1, being utilized in a transmitting microwave transceiver network in a radar system.

7. A power divider, for transmitting signals of a first input terminal, a second input terminal, and a third input terminal to a first output terminal and a second output terminal, the power divider comprising:
    a first connecting wire, comprising a first terminal and a second terminal;
    a second connecting wire, comprising a first terminal and a second terminal;
    a first ring-shaped transmission unit, comprising a first ground element and a first ring-shaped conductive circle surrounding the first ground element, wherein a first terminal of the first ring-shaped conductive circle is electrically connected to the second input terminal, a second terminal of the first ring-shaped conductive circle is electrically connected to the first terminal of the first connecting wire, and a third terminal of the first ring-shaped conductive circle is electrically connected to the first terminal of the second connecting wire, wherein a width of the first ring-shaped conductive circle is substantially equal to a first value;
    a second ring-shaped transmission unit, comprising a second ground element and a second ring-shaped conductive circle surrounding the second ground element, wherein a first terminal of the second ring-shaped conductive circle is electrically connected to the first output terminal, a second terminal of the second ring-shaped conductive circle is electrically connected to the first input terminal, and a third terminal of the second ring-shaped conductive circle is electrically connected to the second terminal of the first connecting wire, wherein a width of the second ring-shaped conductive circle from the first terminal to the second terminal is substantially equal to a second value, and a width of the second ring-shaped conductive circle from the first terminal to the third terminal is substantially equal to a third value; and
    a third ring-shaped transmission unit, comprising a third ground element and a third ring-shaped conductive circle surrounding the third ground element, wherein a first terminal of the third ring-shaped conductive circle is electrically connected to the second output terminal, a second terminal of the third ring-shaped conductive circle is electrically connected to the third input terminal, and a third terminal of the second ring-shaped conductive circle is electrically connected to the second terminal of the second connecting wire, wherein a width of the third ring-shaped conductive circle from the first terminal to the second terminal is substantially equal to a fourth value, and a width of the third ring-shaped conductive circle from the first terminal to the third terminal is substantially equal to a fifth value;

wherein the second value is not equal to the third value, and the fourth value is not equal to the fifth value.

8. The power divider of claim 7, wherein the second value is equal to the fourth value, the third value is equal to the fifth value, a ratio between the second value and the third value or a ratio between the fourth value and the fifth value is related to a power ratio from the first input terminal, the second input terminal, and the third input terminal to the first output terminal and the second output terminal.

9. The power divider of claim 8, wherein the ratio between the second value and the third value or the ratio between the fourth value and the fifth value is between 0 and 1, such that a power ratio of the first input terminal, the second input terminal, and the third input terminal relative to the first output terminal complies with a relationship of a:b:c, and a power ratio of the first input terminal, the second input terminal, and the third input terminal relative to the second output terminal complies with a relationship of c:b:a.

10. The power divider of claim 9, wherein "a" is a value between 1 and 10, "b" is a value equal to 1, and "c" is a value between 0.001 and 0.1.

11. The power divider of claim 7, being utilized in a receiving microwave transceiver network in a radar system.

12. A radio-frequency transceiver system comprising:
a transmitting power divider, for transmitting a signal of an input terminal to a first output terminal, a second output terminal, a third output terminal, and a fourth output terminal, the transmitting power divider comprising:
  a first connecting wire, comprising a first terminal and a second terminal;
  a second connecting wire, comprising a first terminal and a second terminal;
  a first ring-shaped transmission unit, comprising a first ground element and a first ring-shaped conductive circle surrounding the first ground element, wherein a first terminal of the first ring-shaped conductive circle is electrically connected to the input terminal, a second terminal of the first ring-shaped conductive circle is electrically connected to the first terminal of the first connecting wire, and a third terminal of the first ring-shaped conductive circle is electrically connected to the first terminal of the second connecting wire, wherein a width of the first ring-shaped conductive circle is substantially equal to a first value;
  a second ring-shaped transmission unit, comprising a second ground element and a second ring-shaped conductive circle surrounding the second ground element, wherein a first terminal of the second ring-shaped conductive circle is electrically connected to the second terminal of the first connecting wire, a second terminal of the second ring-shaped conductive circle is electrically connected to the first output terminal, and a third terminal of the second ring-shaped conductive circle is electrically connected to the second output terminal, wherein the second ring-shaped conductive circle comprises a plurality of segments each with a length substantially equal to a quarter wavelength of the signal, and the plurality of segments are substantially divided into a plurality of groups according to widths of the segments; and
  a third ring-shaped transmission unit, comprising a third ground element and a third ring-shaped conductive circle surrounding the third ground element, wherein a first terminal of the third ring-shaped conductive circle is electrically connected to the second terminal of the second connecting wire, a second terminal of the third ring-shaped conductive circle is electrically connected to the fourth output terminal, and a third terminal of the second ring-shaped conductive circle is electrically connected to the third output terminal, wherein the third ring-shaped conductive circle comprises a plurality of segments each with a length substantially equal to a quarter wavelength of the signal, and the plurality of segments are substantially divided into a plurality of groups according to widths of the segments;
a receiving power divider, for transmitting signals of a first input terminal, a second input terminal, and a third input terminal to a fifth output terminal and a sixth output terminal, the receiving power divider comprising:
  a third connecting wire, comprising a first terminal and a second terminal;
  a fourth connecting wire, comprising a first terminal and a second terminal;
  a fourth ring-shaped transmission unit, comprising a fourth ground element and a fourth ring-shaped conductive circle surrounding the fourth ground element, wherein a first terminal of the fourth ring-shaped conductive circle is electrically connected to the second input terminal, a second terminal of the fourth ring-shaped conductive circle is electrically connected to the first terminal of the third connecting wire, and a third terminal of the fourth ring-shaped conductive circle is electrically connected to the first terminal of the fourth connecting wire, wherein a width of the fourth ring-shaped conductive circle is substantially equal to a first value;
  a fifth ring-shaped transmission unit, comprising a fifth ground element and a fifth ring-shaped conductive circle surrounding the fifth ground element, wherein a first terminal of the fifth ring-shaped conductive circle is electrically connected to the first output terminal, a second terminal of the fifth ring-shaped conductive circle is electrically connected to the first input terminal, and a third terminal of the fifth ring-shaped conductive circle is electrically connected to the second terminal of the third connecting wire, wherein a width of the fifth ring-shaped conductive circle from the first terminal to the second terminal is substantially equal to a second value, and a width of the fifth ring-shaped conductive circle from the first terminal to the third terminal is substantially equal to a third value; and
  a sixth ring-shaped transmission unit, comprising a sixth ground element and a sixth ring-shaped conductive circle surrounding the sixth ground element, wherein a first terminal of the sixth ring-shaped conductive circle is electrically connected to the second output terminal, a second terminal of the sixth ring-shaped conductive circle is electrically connected to the third input terminal, and a third terminal of the sixth ring-shaped conductive circle is electrically connected to the second terminal of the fourth connecting wire, wherein a width of the sixth ring-shaped conductive circle from the first terminal to the second terminal is substantially equal to a fourth value, and a width of the sixth ring-shaped conductive circle from the first terminal to the third terminal is substantially equal to a fifth value;

wherein the second value is not equal to the third value, and the fourth value is not equal to the fifth value;

a radio-frequency processing unit, for generating a differential transmitting signal, and processing a first differential receiving signal and a second differential receiving signal;

a transmitting array antenna, comprising a first sub-array antennas, a second sub-array antennas, a third sub-array antennas, and a fourth sub-array antennas, respectively coupled to the first output terminal, the second output terminal, the third output terminal, and the fourth output terminal of the transmitting power divider;

a receiving array antenna, comprising a fifth sub-array antennas, a sixth sub-array antennas, and a seventh sub-array antennas, respectively coupled to the first input terminal, the second input terminal, and the third input terminal of the receiving power divider;

a first ring-shaped coupler, coupled between the radio-frequency processing unit and the input terminal of the transmitting power divider, for converting the differential transmitting signal to output to the input terminal;

a second ring-shaped coupler, coupled between the radio-frequency processing unit and the fifth output terminal of the receiving power divider, for converting a signal of the fifth output terminal to the first differential receiving signal; and a third ring-shaped coupler, coupled between the radio-frequency processing unit and the sixth output terminal of the receiving power divider, for converting a signal of the sixth output terminal to the second differential receiving signal.

13. The radio-frequency transceiver system of claim 12, wherein the first output terminal, the second output terminal, the third output terminal, and the fourth output terminal are substantially arranged in a sequence.

14. The radio-frequency transceiver system of claim 13, wherein the second ring-shaped conductive circle and the third ring-shaped conductive circle are symmetrical in accordance with a division between the second output terminal and the third output terminal, such that output signals of the first output terminal and the second output terminal have a first phase, output signals of the third output terminal and the fourth output terminal have a second phase, and the first phase and the second phase are substantially inverse.

15. The radio-frequency transceiver system of claim 14, wherein a width of a segment from the first terminal to the second terminal of the second ring-shaped conductive circle or the third ring-shaped conductive circle is smaller than a width of another segment from the first terminal to the third terminal of the second ring-shaped conductive circle or the third ring-shaped conductive circle, such that a power ratio from the input terminal to the first output terminal, the second output terminal, the third output terminal, and the fourth output terminal complies with a relationship of a:b:b:a.

16. The radio-frequency transceiver system of claim 15, wherein "a" is a value between 0.001 and 0.1, and "b" is a value equal to 1.

17. The radio-frequency transceiver system of claim 12, wherein the second value is equal to the fourth value, the third value is equal to the fifth value, a ratio between the second value and the third value or a ratio between the fourth value and the fifth value is related to a power ratio from the first input terminal, the second input terminal, and the third input terminal to the fifth output terminal and the sixth output terminal.

18. The radio-frequency transceiver system of claim 17, wherein the ratio between the second value and the third value or the ratio between the fourth value and the fifth value is between 0 and 1, such that a power ratio of the first input terminal, the second input terminal, and the third input terminal relative to the fifth output terminal complies with a relationship of a:b:c, and a power ratio of the first input terminal, the second input terminal, and the third input terminal relative to the sixth output terminal complies with a relationship of c:b:a.

19. The radio-frequency transceiver system of claim 18, wherein "a" is a value between 1 and 10, "b" is a value equal to 1, and "c" is a value between 0.001 and 0.1.

20. The radio-frequency transceiver system of claim 12, being utilized in a microwave transceiver network in a radar system.

* * * * *